US007942514B2

(12) United States Patent
Jones et al.

(10) Patent No.: US 7,942,514 B2
(45) Date of Patent: May 17, 2011

(54) KEYING ELEMENTS FOR SOLID INK LOADER

(75) Inventors: Brent Rodney Jones, Sherwood, OR (US); Brian Walter Aznoe, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 1064 days.

(21) Appl. No.: 11/736,436

(22) Filed: Apr. 17, 2007

(65) Prior Publication Data

US 2008/0151025 A1 Jun. 26, 2008

Related U.S. Application Data

(60) Provisional application No. 60/871,439, filed on Dec. 21, 2006.

(51) Int. Cl.
*B41J 2/175* (2006.01)
*G01D 11/00* (2006.01)

(52) U.S. Cl. ........................................ 347/88; 347/99

(58) Field of Classification Search .................... 347/20, 347/56, 84, 85, 88, 95, 99
See application file for complete search history.

(56) References Cited

U.S. PATENT DOCUMENTS

| | | | | |
|---|---|---|---|---|
| 5,541,624 | A * | 7/1996 | Cooke et al. | 347/88 |
| 5,861,903 | A * | 1/1999 | Crawford et al. | 347/88 |
| 6,543,867 | B1 | 4/2003 | Jones | |
| 6,561,636 | B1 | 5/2003 | Jones | |
| 6,565,200 | B1 | 5/2003 | Jones | |
| 6,565,201 | B1 | 5/2003 | Jones | |
| 6,572,225 | B1 | 6/2003 | Jones | |
| 6,648,435 | B1 | 11/2003 | Jones | |
| 6,679,591 | B2 | 1/2004 | Jones | |
| 6,705,710 | B2 | 3/2004 | Jones et al. | |
| 6,709,094 | B2 | 3/2004 | Jones | |
| 6,719,413 | B2 | 4/2004 | Jones | |
| 7,104,635 | B2 | 9/2006 | Jones | |
| 7,108,363 | B2 | 9/2006 | Jones et al. | |
| 2003/0202056 | A1 | 10/2003 | Jones et al. | |
| 2004/0201651 | A1 * | 10/2004 | Jones et al. | 347/84 |

* cited by examiner

*Primary Examiner* — Geoffrey Mruk
(74) *Attorney, Agent, or Firm* — Maginot, Moore & Beck LLP

(57) ABSTRACT

Insertion elements can be used to provide keying features for ink loaders. Such elements connect to ink stick receptacles in the loader. The insertion elements can provide a border to a non-integer number of edges of the receptacles and be shaped to complement at least a portion of the perimeter of an ink stick. A solid ink loader that includes at least one feed channel for receiving ink sticks can use the insertion elements. The insertion elements can be part of a keying system that includes keying features supplied by both the insertion element and the receptacle itself. Multi-component key plate systems can be used as well.

17 Claims, 16 Drawing Sheets

KEYING ELEMENTS FOR SOLID INK LOADER

CROSS REFERENCE TO RELATED APPLICATIONS

This application claims the benefit of Provisional Patent Application No. 60/871,439, filed Dec. 21, 2006.

Solid ink jet printers were first offered commercially in the mid-1980's. One of the first such printers was offered by Howtek Inc. which used pellets of colored cyan, yellow, magenta and black ink that were fed into shape coded openings. These openings fed generally vertically into the heater assembly of the printer where they were melted into a liquid state for jetting onto the receiving medium. The pellets were fed generally vertically downwardly, using gravity feed, into the printer. These pellets were elongated and tapered on their ends with separate rounded, five, six, and seven sided shapes each corresponding to a particular color.

Later solid ink printers, such as the Tektronix "Phaser"™, the Tektronix "Phaser 300"™, and the "Jolt"™ printer offered by Dataproducts Corporation, used differently shaped solid ink sticks that were either gravity fed or spring loaded into a feed channel and pressed against a heater plate to melt the solid ink into its liquid form. These ink sticks were shape coded and of a generally small size. One system used an ink stick loading system that initially fed the ink sticks into a preload chamber and then loaded the sticks into a load chamber by the action of a transfer lever. Earlier solid or hot melt ink systems used a flexible web of hot melt ink that is incrementally unwound and advanced to a heater location or vibratory delivery of particulate hot melt ink to the melt chamber.

Basic configurations of a four-color ink loader having independent melt plates have been described in previously issued patents such as, for example, U.S. Pat. Nos. 5,734,402, 5,861,903, and 6,056,394. The disclosures of these patents are hereby incorporated by reference in their entirety.

Various solid ink products are being designed that will use one of a group of specific ink shapes associated with particular SKUs (part numbers). Ink SKUs can be used to differentiate different geographic markets and can be used with different price point marketing programs. The physical shape associated with a particular SKU helps to maintain the aforementioned differentiation in market and price point. The ink loader mechanism can be identical for the various ink shapes associated with these SKUs except for the specific shape/size keyed opening in the key plate. Using different key plates solves the problem of how to key for the different ink sticks but creates a new problem in having to deal with the logistics of getting the right fully assembled product with the right loader to the customer or changing out the ink loader or just the key plate in the field. The retrofit or field installable keyed insertion opening surround elements, described in U.S. Pat. Nos. 6,561,636 and 7,108,363 (both of which are hereby incorporated by reference) could address the immediate field logistical problems except that the present solid ink product configuration uses key plates that have broken or discontinuous perimeter edges in the keyed openings, a condition not addressed in those patents.

What is desired is a keying system that is flexible enough to be used in multiple color channel key plates as well as independent color channel key plates where a field installable keying element can be mounted to create or augment the keying function even when only a portion of one or more sides or keying areas is involved. Further, when multiple size ink sticks of identical or similar shape comprise the ink set to be used, it is desirable to enable a more flexible means of making the keyed opening changes easy to accomplish by adding a piece to limit or control travel of other position adjustable elements or by making those elements themselves adjustable.

Embodiments include a first insertion element that connects to an ink stick receptacle in an ink loader. The first insertion element forms a portion of the border of an insertion opening and is shaped to complement a part of a perimeter of an ink stick. The first insertion element complements a non-integer number of sides of the ink stick.

Embodiments also include a key plate for providing ink stick keying elements to a printer. The key plate includes a receptacle through which an ink stick passes and an insertion element attached to the receptacle, the insertion element attaching to a non-integer number of sides of the receptacle.

Embodiments also include an ink loader for use in a phase-change ink printer. The loader includes at least one feed channel for receiving ink sticks, a first receptacle in the loader for allowing ink sticks into the at least one feed channel, and a first insertion element attached to the receptacle. The first receptacle includes a first keying feature to help prevent the insertion of an incorrect ink stick and the first insertion element provides a second keying feature to help prevent the insertion of an incorrect ink stick.

Embodiments also include a system for providing ink stick keying elements to a printer. The system includes a plurality of ink sticks, a receptacle through which the plurality of ink sticks pass, and an insertion element attached to the receptacle. The receptacle includes a first keying feature and the insertion element providing a second keying feature and the plurality of ink sticks has features that complement the first and second keying features.

Embodiments also include an ink loader for use in a phase-change ink printer. The loader includes at least one feed channel for receiving ink sticks, and a key plate for covering the at least one feed channel, wherein the key plate includes a first portion covering a first part of the at least one feed channel, the first portion having no receptacle therein, and a second portion covering a second part of the at least one feed channel, the second portion including a first receptacle, wherein the first receptacle includes at least one keying feature Embodiments also include a keying system for a solid ink loader comprising a plurality of separate key plate elements for use with a solid ink loader having multiple feed channels, wherein at least one key plate element provides keying features for one or more of the multiple feed channels and at least one key plate element has no ink stick receptacle Embodiments also include an insertion element for use in a solid ink loader having first and second channels through which first and second ink sticks are respectively fed to be melted, the first ink sticks having first keying features and the second ink sticks having second keying features, wherein the insertion element is shaped to complement at least some of both the first and the second keying features.

The invention will be described in detail herein with reference to the following figures in which like reference numerals denote like elements and wherein.

Figure 1:
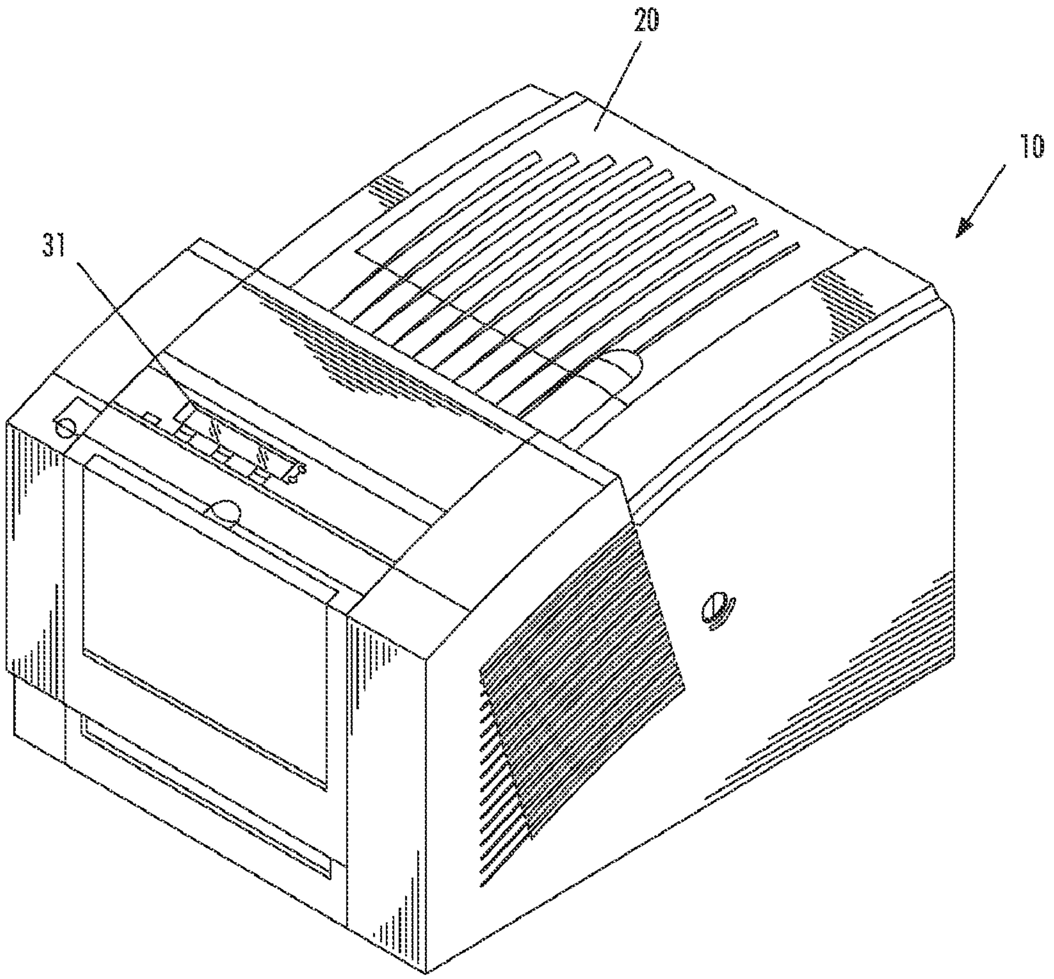
FIG. 1 is a perspective view of an exemplary embodiment of a color printer with the printer top cover closed.
Figure 2A:
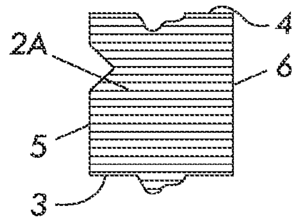
FIG. 2 illustrates a top view of an exemplary embodiment of a set of ink sticks.
Figure 2B:
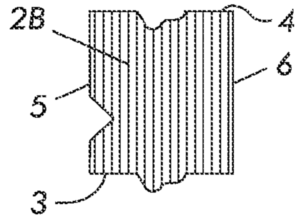
Figure 2C:
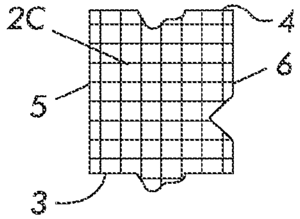
Figure 2D:
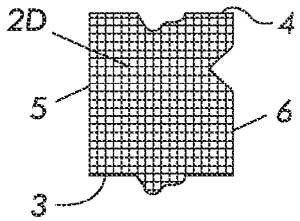

FIG. 1 discloses an embodiment of a solid ink or phase change printer 10 having an ink access cover 20. The ink access cover 20 is shown in a closed position in FIG. 1.

Figure 4:
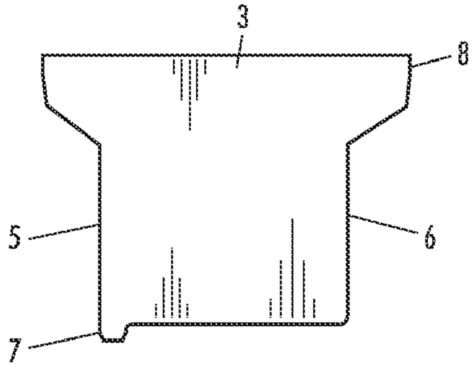
FIG. 4 illustrates a front view of another exemplary embodiment of one of the ink sticks of FIG. 2.
Figure 5:
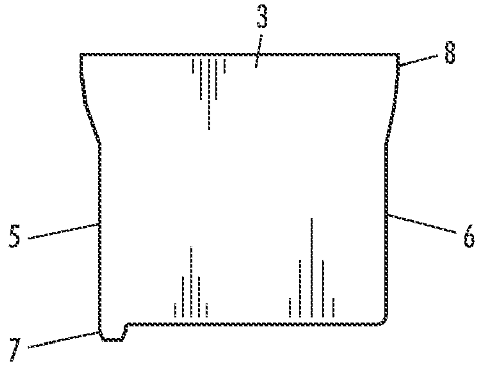
FIG. 5 illustrates a front view of another exemplary embodiment of one of the ink sticks of FIG. 2.
Figure 6:
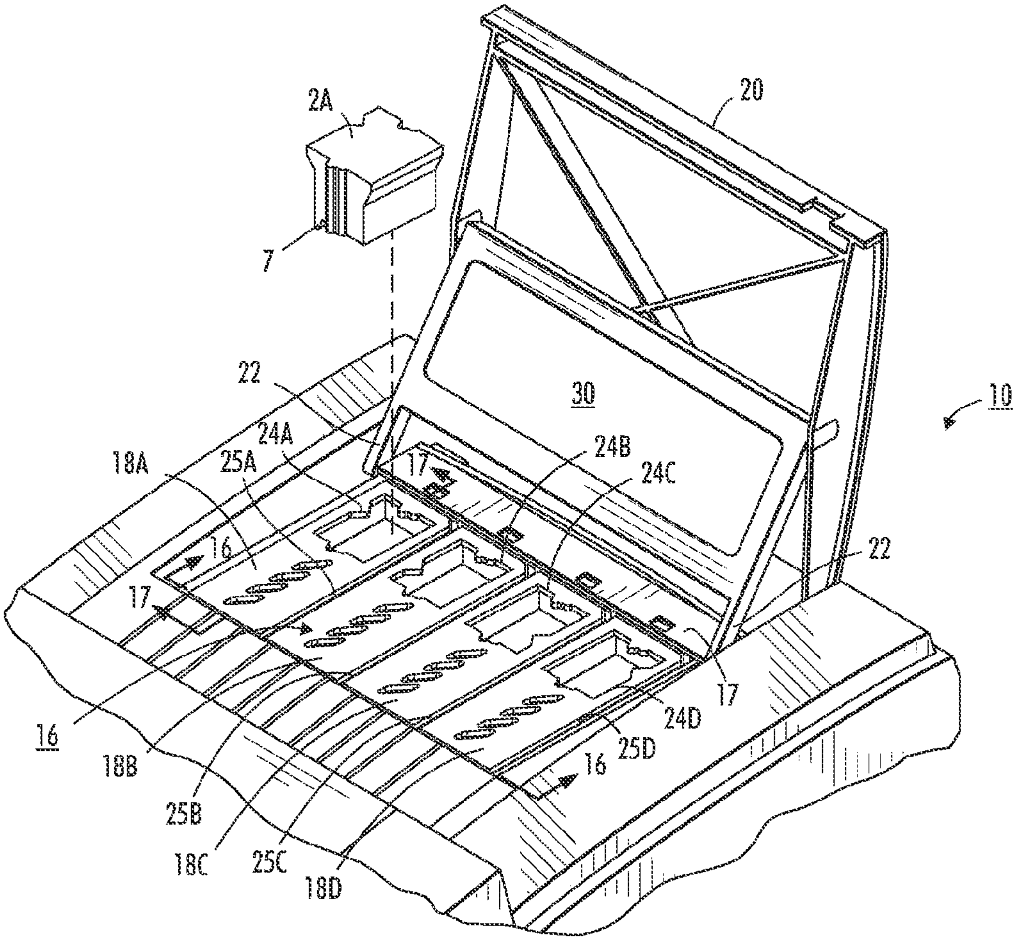
FIG. 6 is an enlarged partial top perspective view of the printer of FIG. 1 with the ink access cover open showing a solid ink stick in position to be loaded into the appropriate ink stick receptacle.

FIGS. 2-5 illustrate embodiments of ink sticks for use with an ink loader, such as, for example, that shown in FIG. 6. As will be noted repeatedly during the description of embodiments, the exact configuration of the ink sticks disclosed herein is not important either to the ink loader disclosed herein, or to specific components thereof. However, a description of general features of the ink sticks is useful for a better understanding of the disclosed embodiments of an ink loader.

Figure 3:
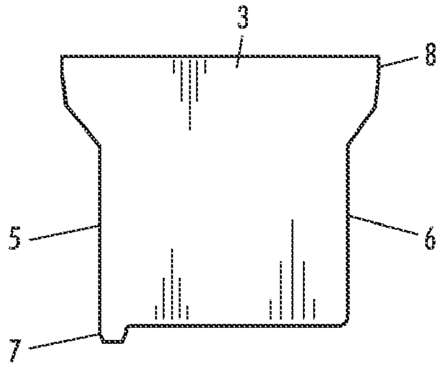
FIG. 3 illustrates a front view of an exemplary embodiment of one of the ink sticks of FIG. 2.

Solid ink sticks 2 are used in phase change ink jet printers such as the printer 10 shown in FIG. 1. In embodiments, the ink sticks have a generally top portion, which can be a substantially horizontal top surface, and a generally bottom portion, which can be a substantially horizontal bottom surface. Side surfaces connect the top and bottom of the ink stick. The side surfaces can be substantially linear from top to bottom, or they can be stepped or segmented, as seen in FIGS. 3-5, which illustrate possible front views of the ink sticks of FIG. 2. In embodiments, the ink sticks for the different ink feed channels of a particular printer can be made identically. In other embodiments, such as the embodiments shown in FIG. 2, each color of ink stick can be made to have a particular perimeter shape, as viewed from above the ink stick, different from the perimeter shapes of other colors of ink sticks. The ink stick perimeter shape can be the shape of either the top or the bottom (or both) of the ink stick, or of protruding portions from the sides of the ink stick. In FIG. 2, each ink stick has a face surface 3, a rear surface 4, a first side surface 5, and a second side surface 6. In the embodiment shown in FIG. 2, the face surface 3 and the rear surface 4 have nonplanar contours. Further, the face surface 3 and the rear surface 4 are designed to substantially complement each other so that the sticks nest together in a feed channel.

The perimeter shape as viewed from the top of the ink stick may include features that extend from the side surfaces below the ink stick top surface. Unless stated otherwise, when the term perimeter is used it shall mean the view looking down on the ink stick, as opposed to the perimeter of the top surface of the ink stick.

Ink sticks can have different shapes to distinguish them from other ink sticks. Such differentiation can be done for ink sticks to be used in two different machines or for different color sticks used by a device. In particular, ink sticks can have different outer perimeter shapes to provide differentiation. Different portions of the perimeter of the ink stick can be associated with different differentiation elements.

In embodiments, the contours of at least portions of the face surfaces 3 and the contours of at least portions of the rear surfaces 4 can be used to distinguish the particular printer model in which the ink sticks should be used. In such embodiments, each ink stick in a particular printer model would have the same face surface contour and the same rear surface contour regardless of the color of the ink stick. However, the contours of the face surfaces and rear surfaces of the ink sticks would be different from the contours of the face and rear surfaces of ink sticks in other printer models. When used with complementary insertion openings or receptacles 24 in key plates 18, shown in FIG. 6, for example, the contours of the front 3 and rear 4 surfaces help prevent the user from adding the wrong ink sticks to a particular printer.

Each color of ink stick 2A-D may have, for example, its own distinctive shape differentiated from other colors of ink sticks by its side surfaces (5, 6). The contour of the first side surface 5 and the contour of the second side surface 6 can be different for each color. When used with complementary insertion openings or receptacles 24 in the key plates 18, the side contours help prevent the user from adding the wrong ink sticks to a particular channel. The front 3 and rear 4 surfaces could also be used to distinguish different colors of ink sticks in various embodiments. Likewise, the side surfaces 5 and 6 could be used for model differentiation. In general, any combination of the surfaces of the ink sticks can be used for various differentiating functions. The ink stick side or surface is the general side and can include all contours or key features that may be present in a side for the purpose of differentiating one side from another (as in front, back, right, left or clocking faces if the general shape has more than four sides). Likewise, they can complement the insertion opening in the ink loader.

FIGS. 2-5 are meant to be exemplary and the particular contours of the face, rear, and side surfaces of the ink sticks and key plates shown in these figures should not be considered limiting. Further, the ink sticks can be any color, but typically will be one of the following four colors: cyan, yellow, magenta, and black. Each color of ink stick will have approximately the same volume as the other colors.

FIG. 6 illustrates the printer 10 with its ink access cover 20 raised. The printer 10 includes an ink load linkage element 30, and an ink stick feed assembly or ink loader 16. In embodiments, key plates 18 are positioned within the printer over a chute divided into multiple feed channels 25. Each of the four ink colors has a dedicated channel for loading, feeding, and melting in the ink loader. The channels 25 guide the solid ink sticks toward melt plates (not shown), located at the opposite end of the channels from the key plate insertion opening. These melt plates melt the ink and feed it into the individual ink color reservoirs within the print head (not shown) of the printer 10. The chute in conjunction with key plates 18 and the melt plates can also provide a housing that can accommodate a single ink stick or a plurality of ink sticks of each color.

The printer can also include a key plate 18, which may be a single plate or comprise multiple key plates such as for example, one key plate for each feed channel 25. Alternatively, ink stick keying elements including insertion elements may be incorporated into an ink loader having no key plate, where the receptacle that receives ink sticks is molded directly into the ink loader. For example, an ink stick receptacle may be formed at the end of the feed channel opposite the end where the ink sticks are melted. See FIG. 18. This approach would be especially useful for vertical or other loaders having an approximate in-line insertion and feed direction. While the following description refers to receptacles, insertion openings, and the insertion elements that attach thereto in a separate key for convenience, it is to be understood that a key plate may not be present and that keying may be incorporated into the chute or other general ink loader structure directly as shown and described with respect to FIG. 18. Insertion or surround element, in the context of this invention, is an additive, subtractive or movable element of any size or shape that influences the nominal admit-ability of an ink stick in the ink loader device of a printing product.

Figure 7:
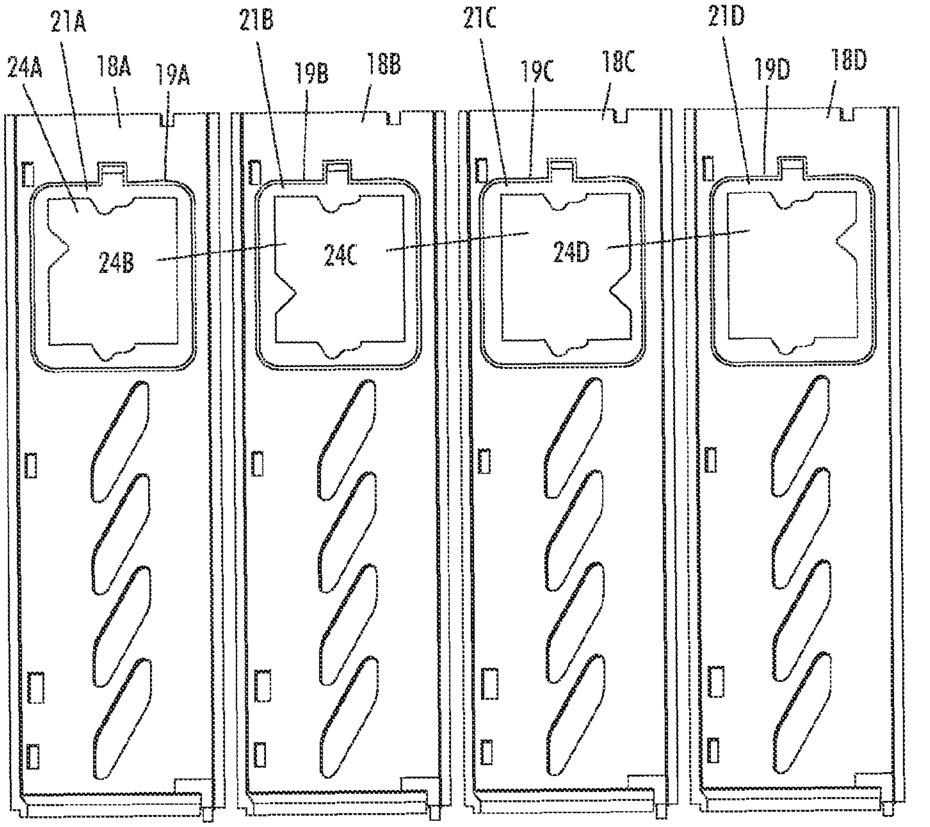
FIG. 7 illustrates a top view of a set of key plates comprising exemplary embodiments of insertion opening defining elements for the printer of FIGS. 1 and 6.
Figure 8:
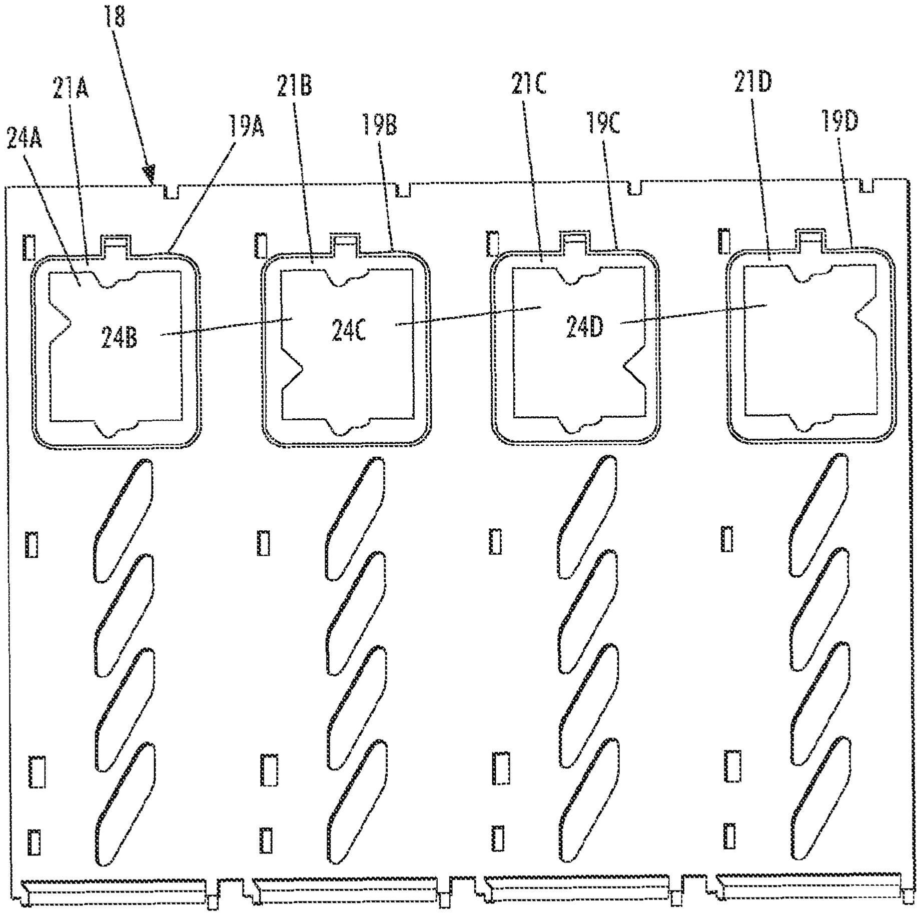
FIG. 8 illustrates a top view of a key plate comprising the exemplary embodiments of insertion opening defining elements for the printer of FIGS. 1 and 6.

The key plates 18A-D have receptacles or insertion openings 24 through which ink sticks are inserted into the channels 25 as shown in FIGS. 7-8. In embodiments, separate insertion opening surround elements 21 are inserted into enlarged insertion opening receptacles 19 to define the ink stick openings 24. Key plates 18 having ink stick insertion opening surround elements 21 offer flexibility in ink loader manufacturing and assemblies. The elements 21 shown in FIGS. 7-8 completely surround and define the insertion openings 24. However, these surround elements are just a subset of the set of insertion elements that could be used.

Each ink stick opening 24 in the key plates 18 corresponds to a particular channel 25 and has a shaped or keyed insertion opening or ink stick receptacle 24 corresponding to a particular ink stick perimeter shape. Ink sticks 2 are inserted into the appropriately shaped openings 24 at the insertion end of each feed channel. Generally, each key plate 18 or insertion opening surround element 21 has an insertion opening 24 having a shape that corresponds to (is keyed to) the perimeter shape of a particular color of ink stick. In embodiments, the openings 24 are shaped to substantially match the perimeter shape of the ink sticks 2 as viewed from the top surface of that ink stick. As noted elsewhere, each color of ink stick 2A-D has differently shaped face, rear, first side, and/or second side features. In embodiments, each keyed opening or receptacle 24 conforms to the top plan view of the ink stick 2. Keying makes accidental mixing of the ink stick colors less probable. The key plate itself, the insert elements 21, or a combination of the two may define the ink stick opening 24 features.

Appropriately keyed insertion openings 24 can contribute to customer friendly ink shapes with a family appearance. In embodiments, the openings can have recognizable shapes to facilitate color slot keying.

If insert elements are used, the enlarged key plate receptacles for the insertion elements can have a common perimeter shape. In such an embodiment, each insertion opening surround element 21 would have a common outer edge that may substantially attach to at least a portion of the shape of the enlarged key plate receptacles 19. The insertion opening surround elements can be formed with appropriately shaped openings 24 to admit the proper ink sticks into the feed channel. FIGS. 7-8 illustrate multiple and single key plate embodiments using insertion opening surround elements 21.

The surround elements can connect to the key plate receptacles by any of a number of means that are well known in the art. These can include, for example, a simple snap-fit or pressure fit, bonding, and vibratory welding. Attachment may be on any portion of any side or at multiple portions of multiple sides, and may be fully or partially on an upper or lower key plate surface or a structural or motion element of the loader independent of the key plate. It should be appreciated that the attachment may not be on the side or sides benefiting from the keying influence of the insertion element.

Separate key plates 18 or ink stick insertion opening surround elements 21 offer flexibility in ink loader manufacturing and assemblies. When individual key plates or insertion opening surround elements are used, it is easier for the user to use color matching to indicate which channels carry which color of ink stick. Having individual key plates or insertion opening surround elements provides improved design and manufacturing flexibility and greater assembly options. For example, the use of a new printhead may require a change in the color order of the channels. The same manufactured key plates could be used in a new printer using this design. However, they could just be inserted in a different order. Additionally, a printer can be retrofitted to accommodate differently shaped ink sticks by replacing the individual key plates 18 or individual insertion opening surround elements 21.

Figure 9:
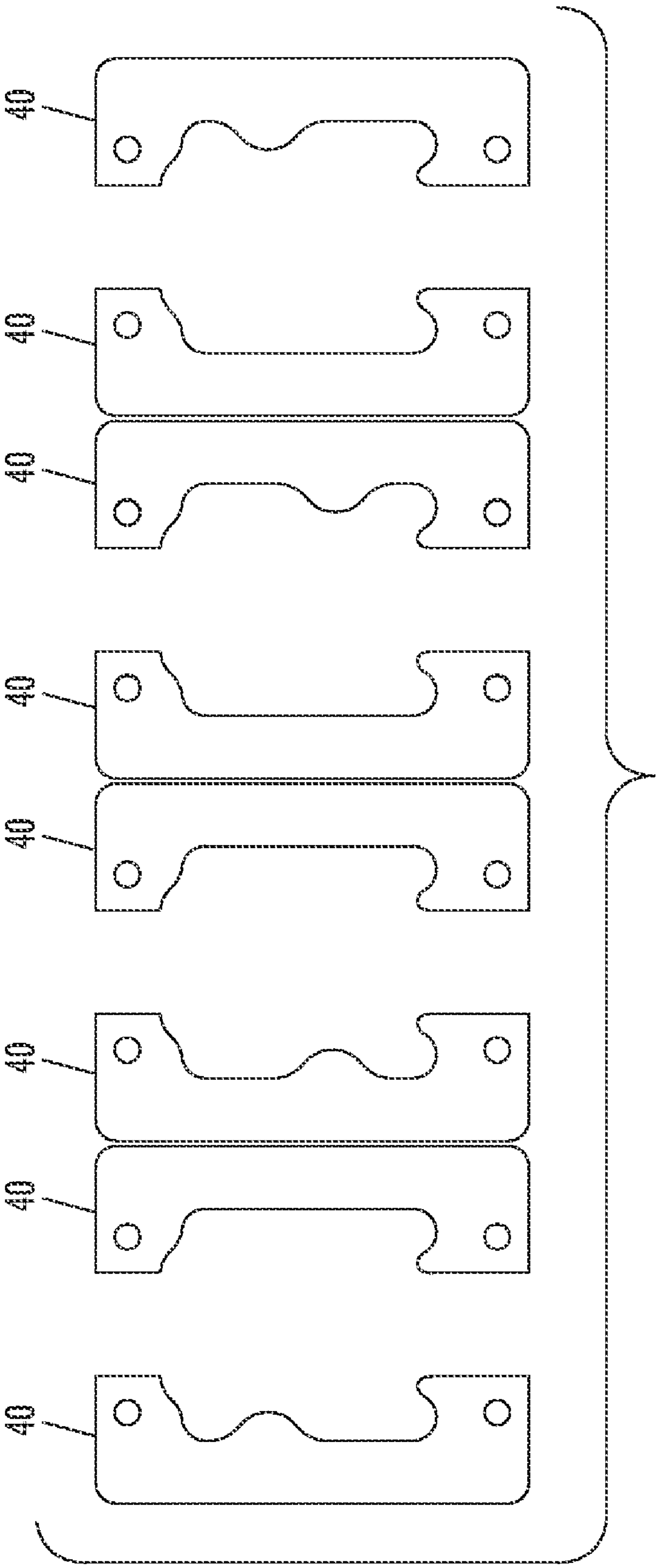
FIG. 9 illustrates exemplary embodiments of insertion elements.
Figure 10:
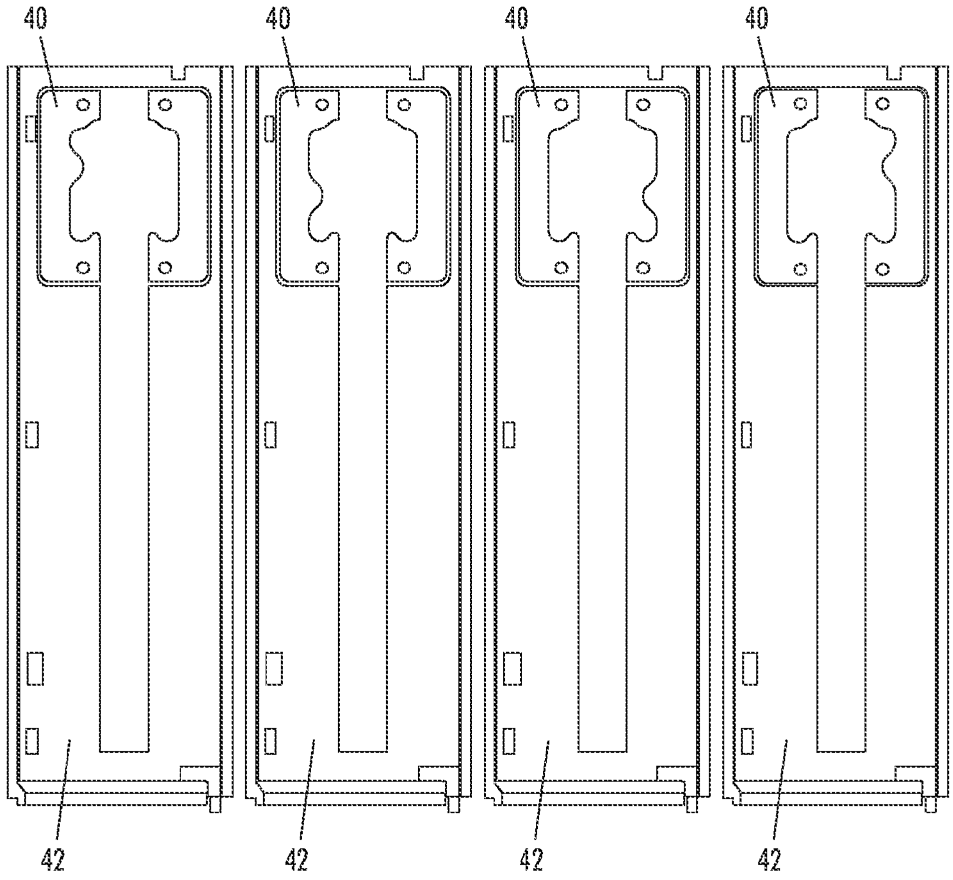
FIG. 10 illustrates the insertion elements of FIG. 9 attached to a receptacle in a key plate.

Insertion elements 21 do not have to provide a complete perimeter to the insertion openings 24, nor do they have to attach to the complete length of a receptacle edge. An insertion element that complements a non-integer number of sides of an ink stick means that the element complements less than the entire edge of at least one side of the ink stick. An insertion element that provides a border for a non-integer number of sides means that the element only provides a partial border to at least one side of the insertion opening. FIG. 9 illustrates some insertion elements 40 that do not provide a complete perimeter or even cover a whole number of sides. In FIG. 9, each insertion element covers one edge and part of two others. These insertion elements 40 are designed to work with key plates that have an opening running the length of the key plate. Key plates will typically have such openings when the springs that pull the push block extend over the ink feed channel. FIG. 10 illustrates such elements 40 attached to the receptacles in a key plate 42.

Figure 11:
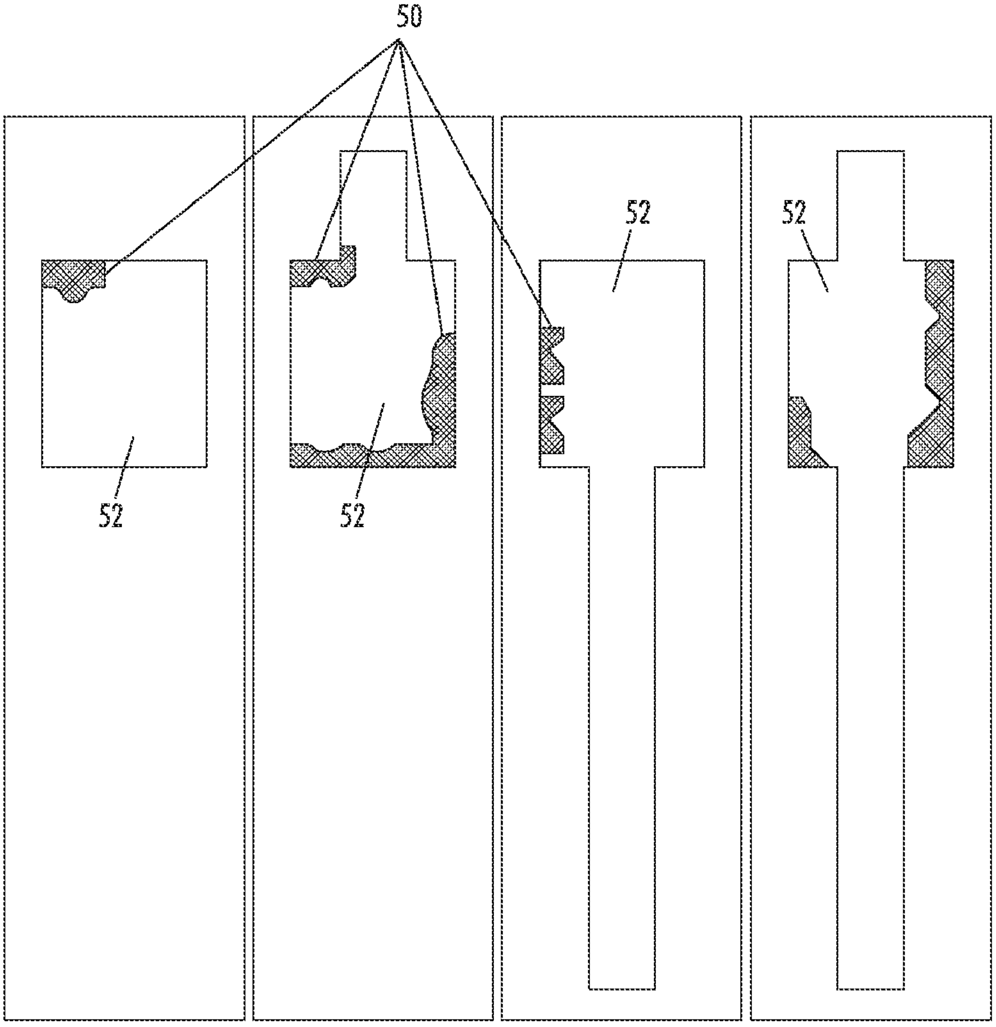
FIGS. 11 and 12 illustrate exemplary embodiments of insertion elements that are attached to a non-integer number of sides of a receptacle in two different types of key plates.
Figure 12:
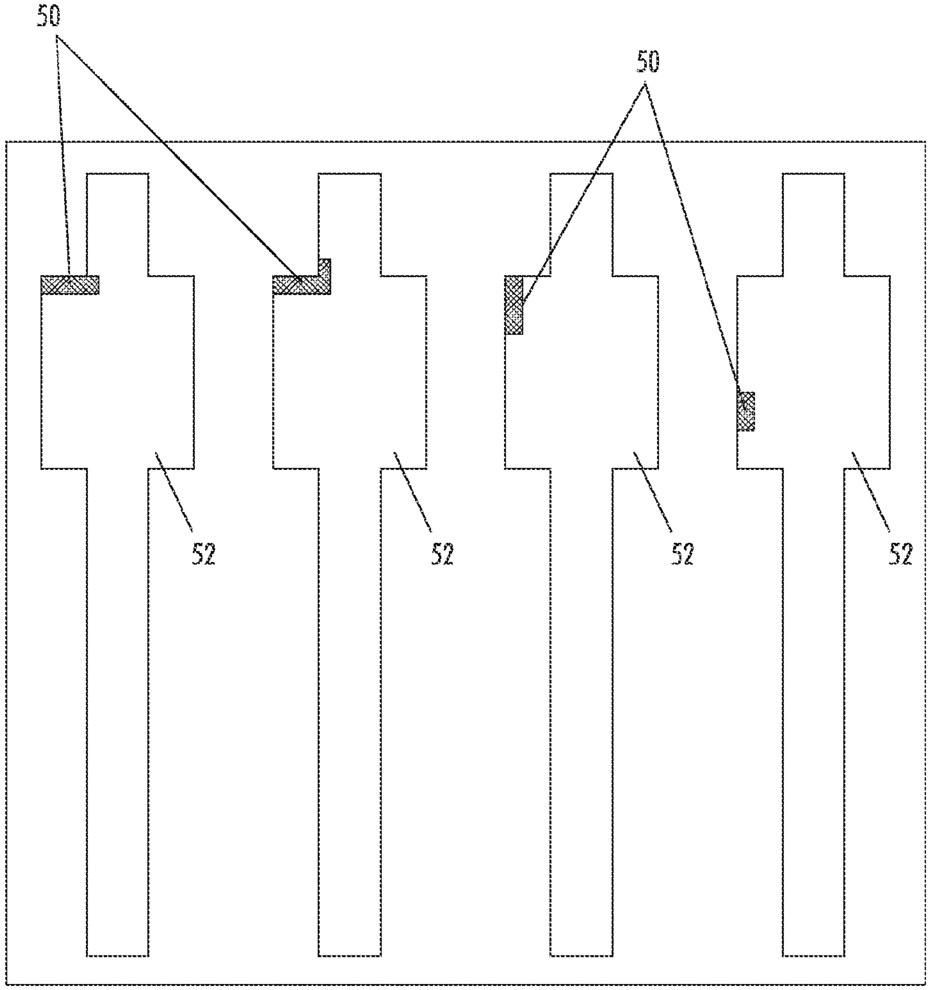

FIGS. 11 and 12 illustrate exemplary insertion elements 50 that have a length unequal to an integer number of sides of the receptacle 52. Some attach and provide keying features to less than one side of a receptacle. Some attach to two sides, but do not cover the full length of at least one of the two sides. Elements 50 can attach to a fraction of one side or more than one side as opposed to attaching to a whole number of sides. Multiple elements may be connected to one edge of the border of a receptacle as well. See the third channel from the left in FIG. 11. In addition, the keying of a slot could be changed simply by translating one of the insertion elements 50 along an edge of the perimeter of receptacle 52. Attach, as in this description, means interface, couple, complete or the like and may not include the coupling or securing means.

Figure 13:
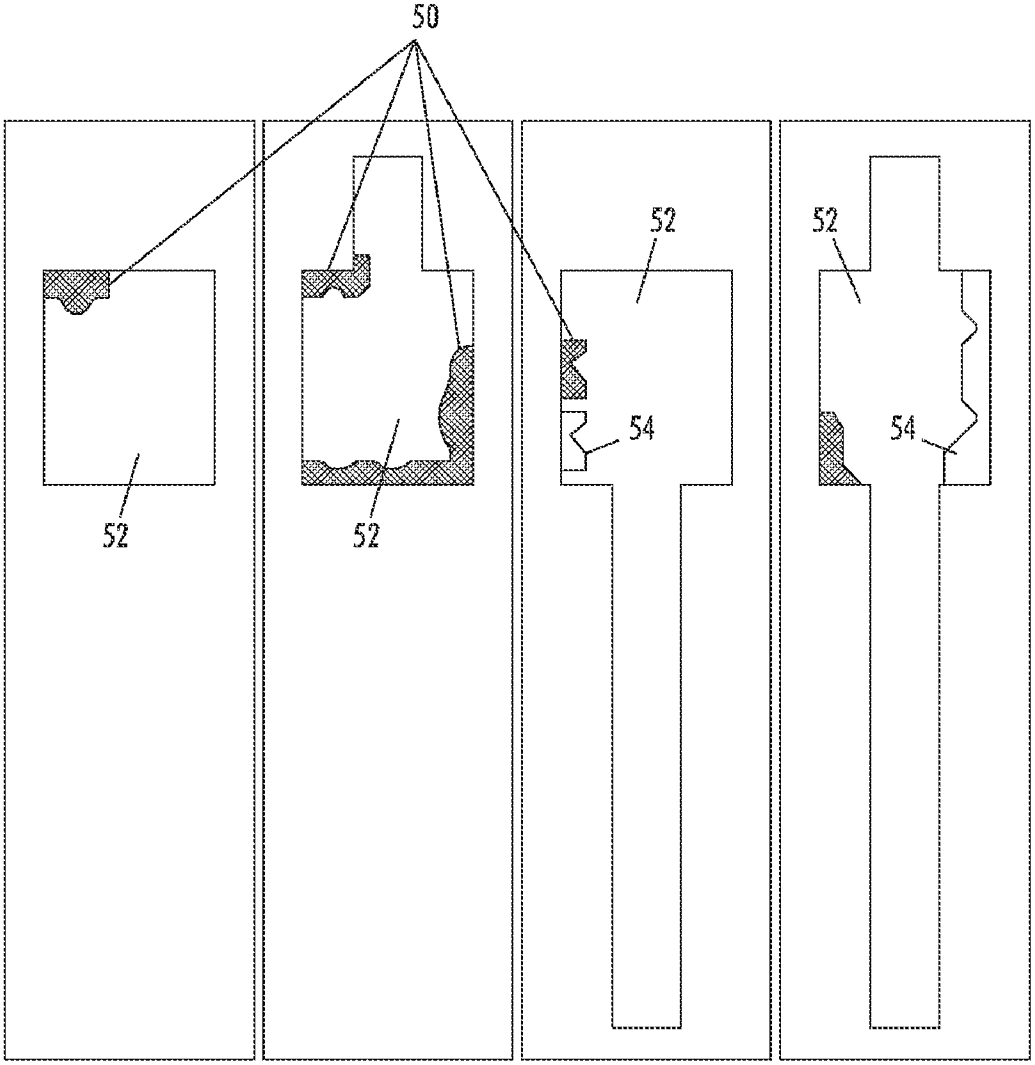
FIG. 13 illustrates exemplary embodiments of keying features supplied by a combination of insertion elements and molded key plate features.

FIG. 13 shows a key plate wherein insertion elements 50 supply some of the keying features and some are inherent features 54 in the molded key plate itself.

Figure 14:
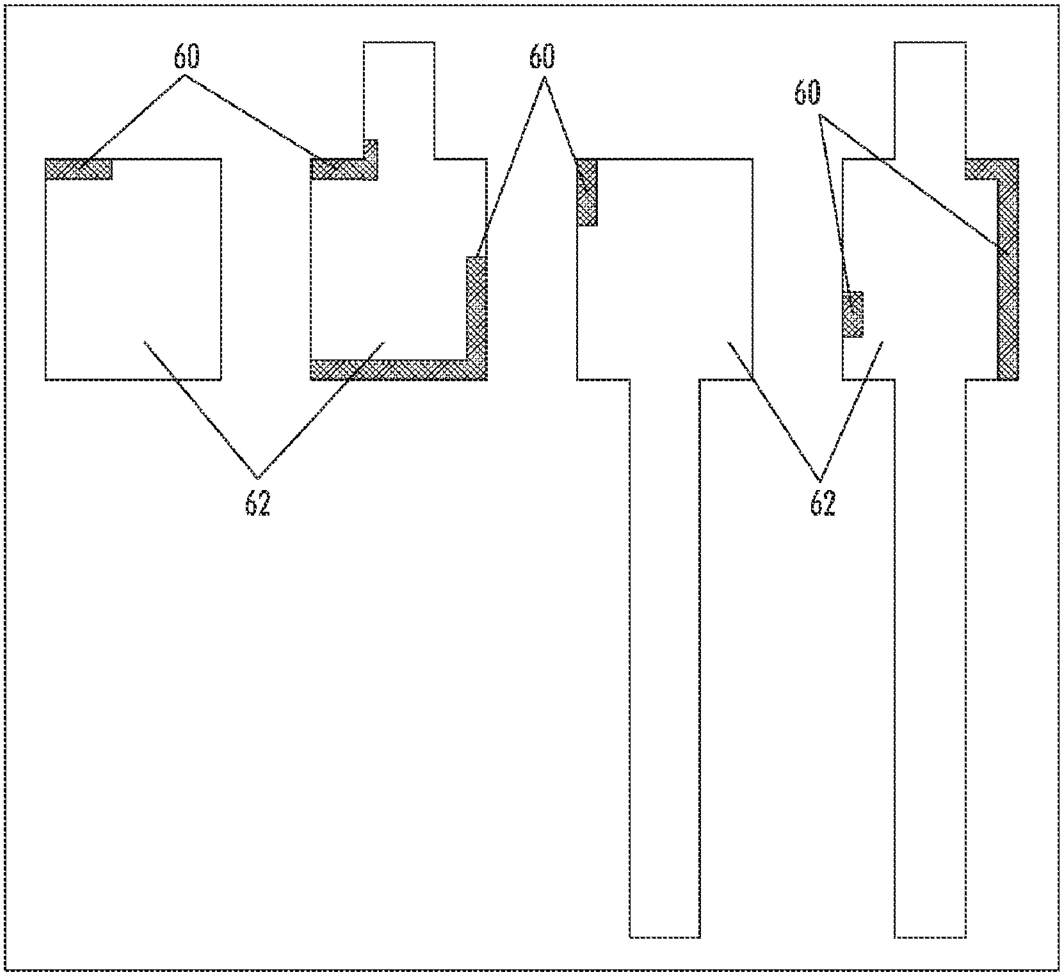
FIG. 14 illustrates volume-displacing inserts without added keying features.

FIG. 14 illustrates insertion elements 60 for receptacles 62 that provide a simpler keying structure. These elements also attach to a non-integer number of sides of the receptacles. Like many other keying features, these elements reduce the volume of the receptacle such that only ink sticks that exactly complement the elements can contain the maximum amount of ink to be delivered to the melt plates at the end of the loader.

Using elements such as those elements 40, 50, 60 in FIGS. 9-14 helps with changing portions of keyed opening areas through which solid ink sticks must pass during loading in the field by adding independent partial area key elements to the key plate and also by changing the travel or position of one or more components that can form a functional area of the keyed opening shape. Keying area changes with this concept includes additive, non-fixed subtractive, and adjustable changes.

The insertion elements could be installed in the field to change the shape of the keyed opening. These keying inserts can be shaped with one or more features or be of a simple shape that primarily alters the size of the keyed opening as in the embodiment disclosed in FIG. 14. They could be removable in the field so that alternative key elements can be used in their place or so that the new opening shape without the keying insert becomes the keyed insertion opening. Independent inserts could be snapped in place or could be interlocked, glued or held by fasteners, such as screws, pins, rivets, and so forth. An adjustable or movable element that may comprise only a portion of one or more keying "sides", such as the yoke, can be restricted in travel to change the opening size for one or more ink stick length and/or width variations beyond a default or nominal size. Thus, an insertion element may be a moving or adjustable element, the adjustment or motion means being any of a range of suitable implementations including an adjustment slot with clamping screw, a two-position solenoid with element retaining guides, a lead-screw and the like. Such a non-fixed adjustable insertion element permits the final shape (including size and other variations of shape) to be established after the initial assembly of the product, such as on a model finalization line in the factory or at a distributor or customer site.

Field modification could include a non-fixed insertion opening shape that has break-off or removable key features that can create a new shape by their removal. Field modification can also be assisted by one or more new or alternative key elements that can be added. Field modification to keying or insertion opening size can also be accomplished with sliding, pivoting elements moved manually or with a mechanism, which could further be under firmware control. Insertion elements could be used independently or in conjunction with full edge or full surround key elements as taught in previous patent concepts. The inserts can be used in receptacles that have full or uninterrupted key opening perimeters or openings that have one or more non-keying function notches, slots, feature extensions or other openings or voids. These inserts can bridge between channel openings, span multiple openings, or form a separate section of the receptacle structure (See FIGS. 15-16) where some areas of the keyed opening are formed by the presence of the field installable section.

Figure 15:
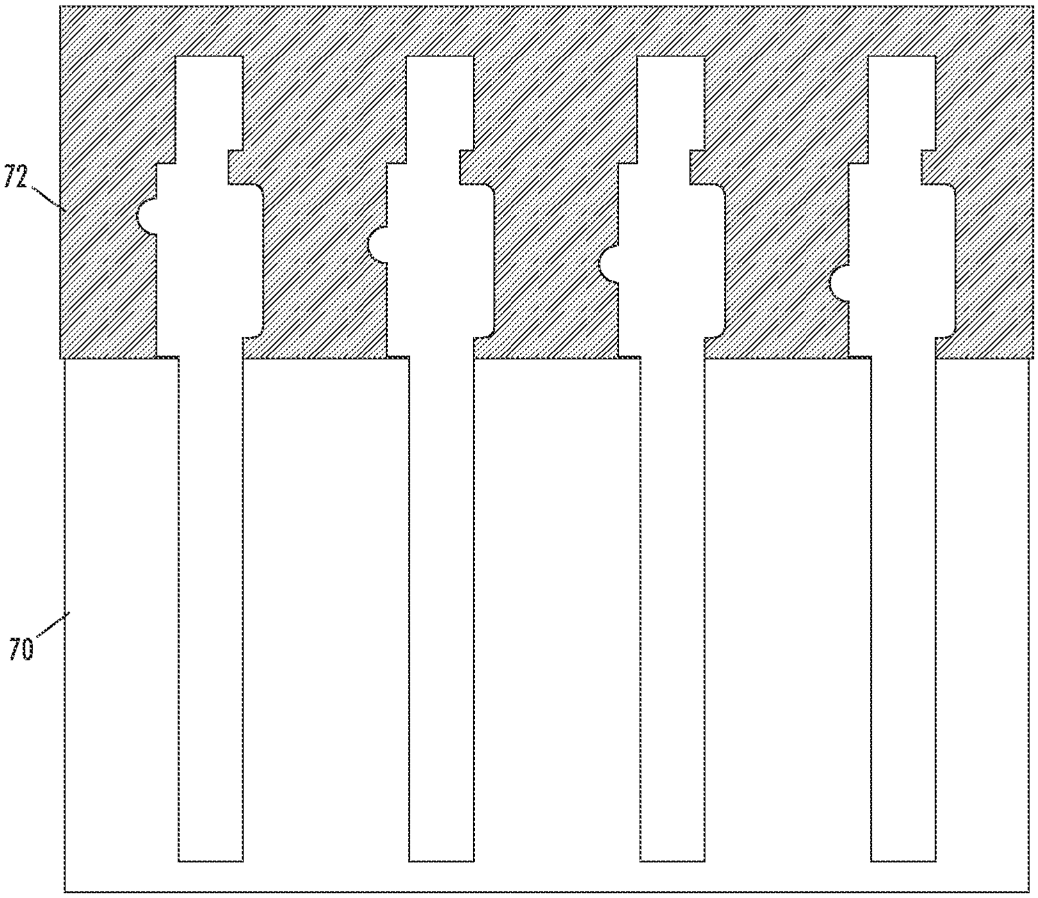
FIG. 15 illustrates a loader with a two-component key plate.

As noted, the key plates that attach to the loader may also have multiple components. FIG. 15 illustrates a two component key plate, wherein one component 70 is generic, while another 72 includes a receptacle that is specifically keyed to allow ink sticks of a particular shape through. Such an embodiment eases the changing or replacing of the key plate. The key plate could have more than two components as well. For example, a four-channel loader could have a key plate having 5 components with a common portion over most of the lengths of the feed channels and 4 separate pieces over the end of the channels in which ink sticks are loaded.

Figure 16:
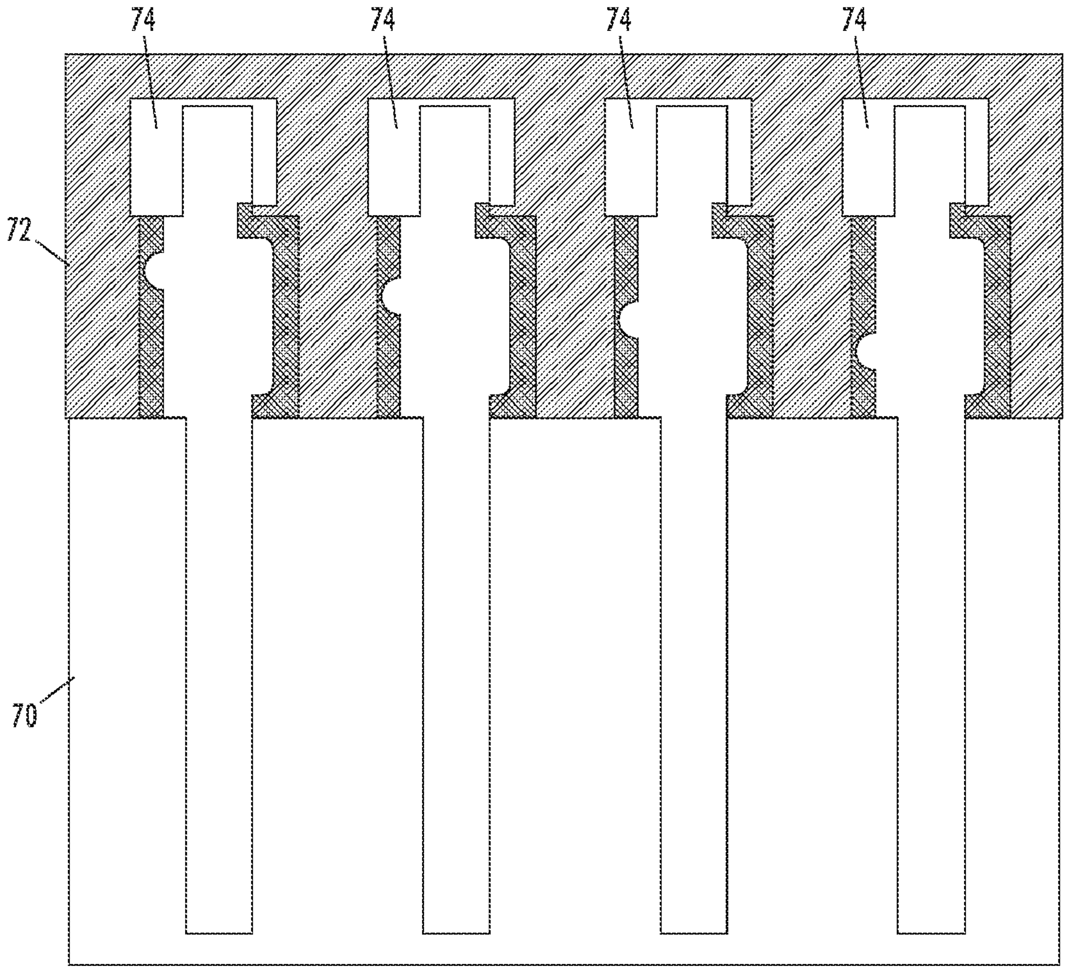
FIG. 16 shows a loader with keying features are provided by a combination of multiple component key plates and insertion elements.

The replaceable component(s) of a key plate could also be further combined with insertion elements. FIG. 16 illustrates a loader having a two component key plate that also includes additional insertion elements 74.

Figure 17:
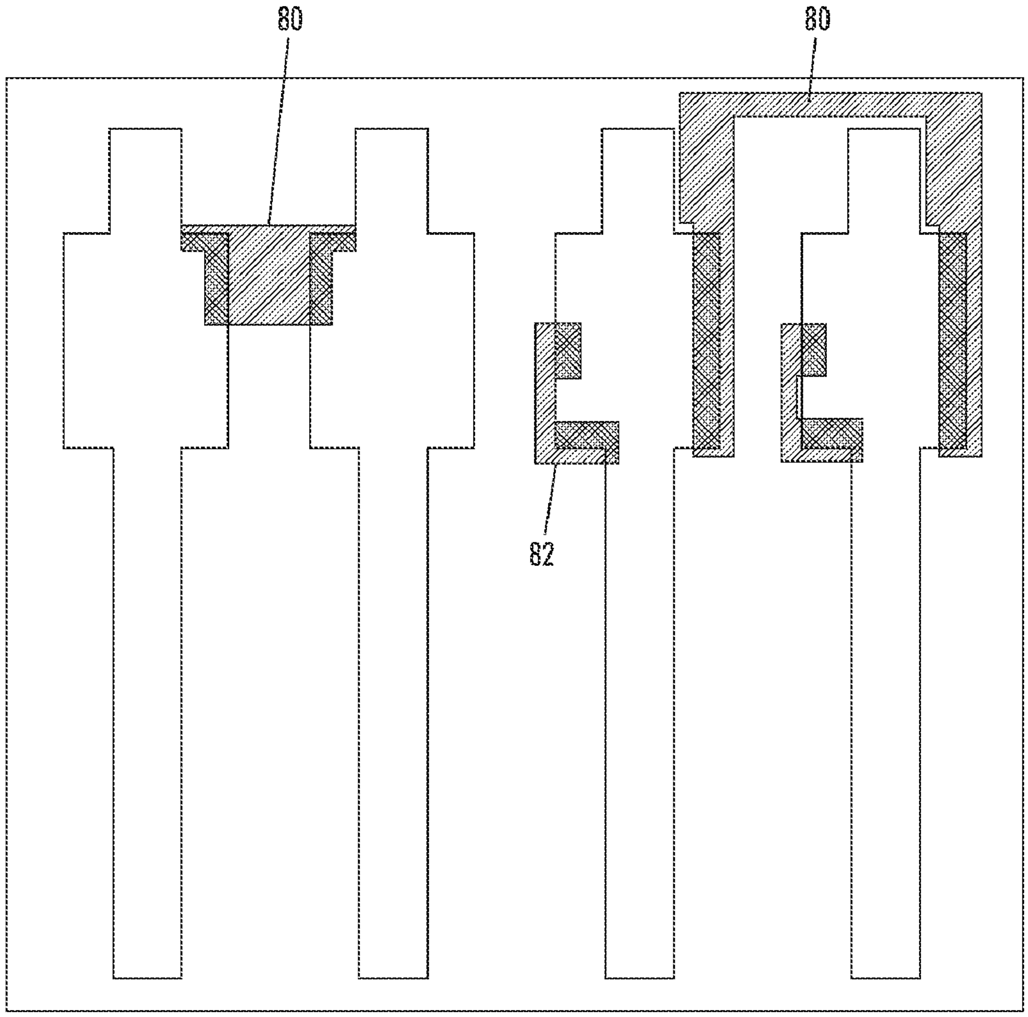
FIG. 17 illustrates multiple channel partial key plate inserts.

Not all insertion elements have to be intra-receptacle. FIG. 17 illustrates an exemplary keying system having insertion elements that provide keying features to more than one feed channel. These inter-receptacle insertion elements 80 may be usable on their own or in conjunction with intra-receptacle insertion elements 82.

Figure 18:
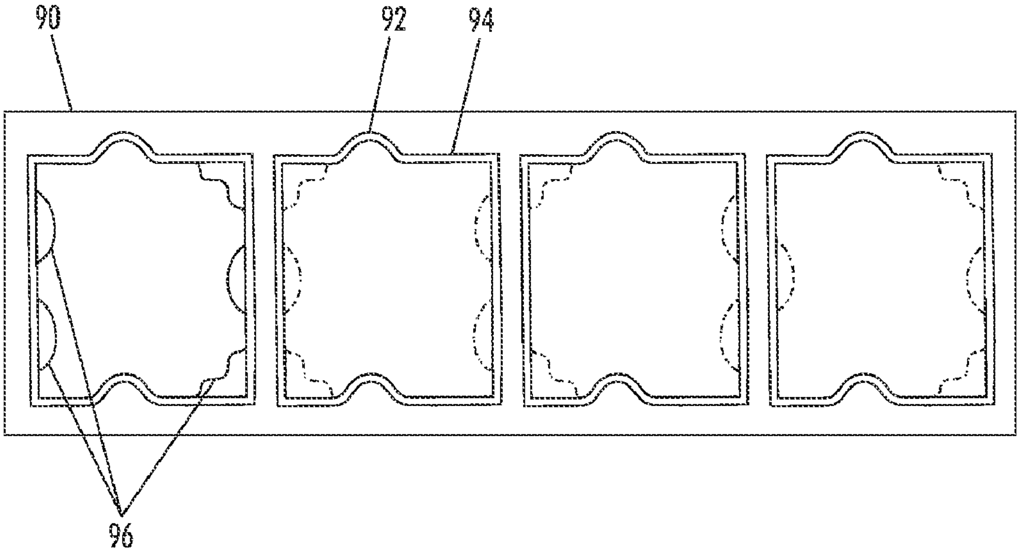
FIG. 18 illustrates a feed end view of an ink stick feed loader with rear ink stick insertion openings.

FIG. 18 illustrates another embodiment of a loader 90 where ink sticks are fed through the end of the loader as opposed to inserting the ink sticks through a "top" opening or an opening perpendicular to the direction of travel. Similarly, the keying elements of the opening may be a molded portion 92 of the opening 94 or may be created through the use of insertion elements 96.

Variations to field keying modification techniques are quite extensive and are in no way limited to the embodiments disclosed herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. An insertion element comprising:

a member having a configuration that complements a portion of a perimeter of an ink stick; and a connector that extends from the member, the connector being configured to position the member at an ink stick insertion opening to enable the member to modify the ink stick insertion opening from having a first shape that complements an ink stick having a first ink stick perimeter to a second shape that complements an ink stick having a second ink stick perimeter, the first ink stick perimeter being different than the second ink stick perimeter, and to provide a partial border for the ink stick insertion opening that is shorter than a length of a single side of the ink stick insertion opening.

2. The insertion element of claim 1, wherein the connector is configured to attach to a surface of a key plate to position the member at the ink stick insertion opening.

3. The insertion element of claim 1, wherein the connector is a pivot that enables the member to move to and away from the ink stick insertion opening to enable the ink stick insertion opening to selectively have the first shape and the second shape.

4. A key plate comprising:

an ink stick insertion opening configured to have a shape that receives an ink stick having a first perimeter shape; and a first insertion element having a member and a connector, the connector being configured to attach to a surface of the key plate to position the member at the ink stick insertion opening to modify the ink stick insertion opening from the shape that receives the ink stick having the first perimeter shape to a shape that receives an ink stick having a second ink stick perimeter, the first ink stick perimeter being different than the second ink stick perimeter, and to provide a partial border for the ink stick insertion opening that is shorter than a length of a single side of the ink stick insertion opening.

5. The key plate of claim 4 wherein the connector is configured to attach to an upper surface of the key plate.

6. An ink loader for use in a phase-change ink printer, the ink loader comprising:

a feed channel through which ink sticks travel toward a first end of the feed channel;

an ink stick insertion opening in the loader that is configured to receive an ink stick having a first ink stick perimeter and enable the ink stick to travel through the feed channel;

a member having a configuration that complements a portion of a perimeter of an ink stick; and a connector that extends from the member, the connector being configured to position the member at the ink stick insertion opening to enable the member to modify the ink stick insertion opening from having a first shape that complements an ink stick having the first ink stick perimeter to a second shape that complements an ink stick having a second ink stick perimeter, the first ink stick perimeter being different than the second ink stick perimeter, and to provide a partial border for the ink stick insertion opening that is shorter than a length of a single side of the ink stick insertion opening.

7. The ink loader of claim 6, further comprising:

a key plate that is positioned over a top of the feed channel and the ink stick insertion opening is formed in the key plate.

8. The ink loader of claim 6, wherein the ink stick insertion opening is formed at a second end of the feed channel that is opposite the first end of the feed channel.

9. A solid ink stick loader comprising:

an ink stick insertion opening having a keying feature that configures the ink stick insertion opening to receive ink sticks having a first ink stick perimeter;

a member having a configuration that complements a portion of a perimeter of an ink stick; and a connector that extends from the member, the connector being configured to position the member at the ink stick insertion opening to enable the member to modify the ink stick insertion opening from having a first shape that complements an ink stick having the first ink stick perimeter to a second shape that complements an ink stick having a second ink stick perimeter, the first ink stick perimeter being different than the second ink stick perimeter, and to provide a partial border for the ink stick insertion opening that is shorter than a length of a single side of the ink stick insertion opening.

10. The solid ink stick loader of claim 9 wherein the keying feature and the member are positioned along one edge of the ink stick insertion opening.

11. The solid ink stick loader of claim 9, wherein the ink stick insertion opening is formed in a key plate that is configured to be attached to the solid ink stick loader.

12. A solid ink stick loader for use in a phase-change ink printer comprising:

at least one feed channel configured to receive ink sticks;

a first key plate element positioned to cover at least a portion of the at least one feed channel, the first key plate element including a first receptacle ink stick insertion opening having a keying feature, the first ink stick insertion opening configured to receive an ink stick having a first ink stick perimeter; and a second key plate element positioned to cover a second portion of the at least one feed channel, the second key plate element having no ink stick insertion opening and being separable from the first key plate element.

13. The solid ink stick loader of claim 12 further comprising at least one member having a configuration that complements a portion of a perimeter of an ink stick; and at least one connector that extends from the at least one member, the connector being configured to position the member at the first ink stick insertion opening to enable the member to modify the first ink stick insertion opening from having a first shape that complements a first ink stick perimeter to a second shape that complements an ink stick having a second ink stick perimeter, the first ink stick perimeter being different than the second ink stick perimeter.

14. An insertion element comprising:

a member having a first keying feature and a second keying feature; and at least one connector that extends from the member, the connector being configured to position the first keying feature of the member at a first ink stick insertion opening to enable the first keying feature to modify the first ink stick insertion opening from having a first shape that complements a first ink stick perimeter to a second perimeter shape that complements a second ink stick perimeter and to position the second keying of the member at a second ink stick insertion opening to enable the second keying feature to modify the second ink stick insertion opening from having a third shape that complements a third ink stick perimeter to a fourth perimeter shape that complements a fourth ink stick perimeter, the first ink stick perimeter, the second ink stick perimeter, the third ink stick perimeter, and the fourth ink stick perimeter being different from one another.

15. The loader of claim 14, wherein the first and second keying features are different.

16. The insertion element of claim 14, wherein the first and second keying features are the same.

17. The insertion element of claim 14, wherein the first and second ink stick insertion openings are formed in a key plate attached to the loader.

* * * * *